United States Patent
Kovacs et al.

(10) Patent No.: US 12,307,215 B2
(45) Date of Patent: *May 20, 2025

(54) PARTIAL EXECUTION OF TRANSLATION IN BROWSER

(71) Applicant: Lilt, Inc., Emeryville, CA (US)

(72) Inventors: Geza Kovacs, San Francisco, CA (US); John DeNero, Berkeley, CA (US)

(73) Assignee: Lilt, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,833

(22) Filed: Nov. 30, 2023

(65) Prior Publication Data

US 2024/0095470 A1    Mar. 21, 2024

Related U.S. Application Data

(63) Continuation of application No. 17/468,524, filed on Sep. 7, 2021, now Pat. No. 11,900,073.

(51) Int. Cl.
    *G06F 40/58*    (2020.01)
    *G06N 3/04*    (2023.01)
    *G06N 3/08*    (2023.01)

(52) U.S. Cl.
    CPC .............. *G06F 40/58* (2020.01); *G06N 3/04* (2013.01); *G06N 3/08* (2013.01)

(58) Field of Classification Search
    None
    See application file for complete search history.

(56) References Cited

U.S. PATENT DOCUMENTS

| | | | |
|---|---|---|---|
| 8,060,360 B2 | 11/2011 | He | |
| 8,676,563 B2 | 3/2014 | Soricut | |
| 8,996,356 B1 | 3/2015 | Yang | |
| 9,047,274 B2 | 6/2015 | Venkatapathy | |
| 10,346,548 B1 | 7/2019 | Wuebker | |

(Continued)

FOREIGN PATENT DOCUMENTS

| | | |
|---|---|---|
| CN | 110263348 A | 9/2019 |
| CN | 113901841 A | 1/2022 |

(Continued)

*Primary Examiner* — Toan H Vu
(74) *Attorney, Agent, or Firm* — Baker Botts L.L.P.

(57) ABSTRACT

A computer-implemented method is programmed to support efficient and rapid generation of machine translation suggestions on client devices. Network latency is substantially reduced or eliminated by separating certain aspects of the translation workload across multiple classes of tasks, including final neural network output, between a client device and server device. The client device and server device may be connected such that a decoder portion of a machine translation system may be downloaded onto the client device, along with an initial translation suggestion and encoder outputs associated with a document, which document is in a source language to be translated into a target language. The initial translation suggestion may be replaced by an updated machine translation suggestion as a user inputs text in the target language called a prefix. This updated machine translation is generated on the client-side decoder using the previously-downloaded encoder outputs as input and the prefix as constraint.

30 Claims, 4 Drawing Sheets

(56) References Cited

U.S. PATENT DOCUMENTS

| | | | |
|---|---|---|---|
| 10,878,201 B1 | 12/2020 | Wuebker | |
| 11,361,170 B1 | 6/2022 | Shastry | |
| 11,704,504 B2 | 7/2023 | Li | |
| 2009/0326911 A1 | 12/2009 | Menezes | |
| 2011/0184719 A1 | 7/2011 | Christ | |
| 2014/0288914 A1 | 9/2014 | Shen | |
| 2017/0068665 A1 | 3/2017 | Tamura | |
| 2017/0083513 A1* | 3/2017 | Jiang | G06F 40/55 |
| 2018/0011843 A1 | 1/2018 | Lee | |
| 2018/0081870 A1 | 3/2018 | Zelenkov | |
| 2018/0165278 A1 | 6/2018 | He | |
| 2019/0354593 A1 | 11/2019 | Rojas | |
| 2021/0082407 A1* | 3/2021 | Kim | G06F 40/40 |
| 2021/0319020 A1* | 10/2021 | Walters | G06N 3/045 |
| 2022/0086302 A1* | 3/2022 | Kato | G06F 40/58 |
| 2022/0207245 A1 | 6/2022 | Kim | |
| 2022/0335227 A1* | 10/2022 | Chan | G06F 40/44 |

FOREIGN PATENT DOCUMENTS

| | | |
|---|---|---|
| CN | 115270825 A | 11/2022 |
| KR | 20190046432 A | 5/2019 |

\* cited by examiner

PARTIAL EXECUTION OF TRANSLATION IN BROWSER

BENEFIT CLAIM

This application claims the benefit under 35 U.S.C. § 120 as a continuation of application Ser. No. 17/468,524, filed Sep. 7, 2021, the entire contents of which are hereby incorporated by reference for all purposes as if fully set forth herein. The applicant hereby rescinds any disclaimer of subject matter that occurred in the prosecution of the parent application and advises the USPTO that the claims presented in this application may be broader than in the parent application.

TECHNICAL FIELD

One technical field of the present disclosure is neural machine translation by a computing device. Another technical field is the allocation of computational load among client devices and server computing devices in client-server systems that implement interactive machine translation systems.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

In an increasingly global economy, the need for fast and accurate translation from one language to another has grown. For companies desiring to do business globally over the Internet, fast and accurate translation is especially acute. Webpages and documents alike are only useful to consumers if they are in a language they can read. Accurate translation requires context beyond simply matching up a word from one language to a word in another; consequently, human translators remain so prevalent. Advanced machine translation systems have emerged as a useful tool to aid these human translators in their efforts.

In contexts where accuracy of a translation is paramount, companies often use an interactive machine translation (MT) system rather than a classic computer-aided translation which simply provides a suggestion based on dictionaries and algorithms without further user input beyond the text to be translated. Interactive machine translation systems have a translator or language learner working in tandem with a translation system. Where machine translation suggestions are used interactively, it is crucial to minimize latency or the amount of time required for translation suggestions to update. Machine translation suggestions must update quickly and with low latency in order to keep up with the rate at which users enter text and allow the system to make timely suggestions that are up to date with what the user has already entered. Low latency maximizes benefit of presenting the suggestions to the user.

Reducing the latency observed by users is particularly important for interactive translation processes given how quickly a user can enter text. A user who is proficient at typing on a keyboard can often type 100 or more English words per minute. That is one word every 600 milliseconds or an average of one character every 120 milliseconds. Speech can be input into a system even faster. Many speakers can speak 200 or more English words per minute, which corresponds to one word every 300 milliseconds. Given a rapid rate of text entry, interactive MT systems must re-compute translations rapidly, potentially multiple times per second to ensure the suggestion is consistent with the user's translation up to that point in the text. Even one second spent by the system on the recomputation of a translation can stall the progress made by a translator relying on the suggestion or prevent the translator from using the updated suggestion at all if the rate of text entry continues to outpace the rate of computation. If the delay in updates is too long, the user may end up entering text without the assistance of MT suggestions while the system is re-computing the suggestion.

In the client-server architecture commonly used in interactive machine translation contexts, the application interface runs on a client device, such as a web browser, desktop application, or mobile device, while the machine translation system runs on a server. Communication between the client and server code over a network results in network latency which slows down the speed at which machine translation suggestion updates can be shown to users. Whenever the user enters new text on the client device, termed a prefix, the prefix is transmitted over a network, such as the internet or a local intranet. After the server re-computes the MT suggestion using the prefix as additional input or a constraint, an updated MT suggestion is sent back to the client. Each time the prefix entered by the user changes, the interactive MT system requires data to be sent from the client to the server and back, which takes time equal to the network round-trip time (RTT) before it can display the updated MT suggestion to the user. Network round-trip times vary depending on the network connection that connects the client to the server, but on wireless and satellite connections, it can easily add several hundred milliseconds to the latency observed by the user. Another source of latency is the computation time required for a neural network or another machine translation algorithm to compute the machine translation suggestions and any updates to these suggestions. Both types of latency increase with longer segments of text. Therefore, a longer piece of text to be translated increases network latency and computation time and can counteract the helpfulness of an interactive MT system. As a result of either or both sources of latency, the user may have already started entering the next word by the time they see the updated MT suggestion, making that MT suggestion out-of-date before it can be used.

Existing methods of interactive machine translation deal with tradeoffs. Relying on a server to compute and re-compute suggestions adds network latency. However, running the full interactive machine translation system on a client device may not be practical for many client systems due to the low space on which to save the full system, which may also require the downloading of terminological dictionaries and translated sentence collections. In order for the usefulness of the interactive machine translation system to be maximized, there must be consideration for client devices with average memory and resources. Even if these devices can store a full machine translation system, they may have much slower computation times because of their having fewer resources than a server system would have. In addition, the parameters of the network may change regularly in an adaptive machine translation system, which poses challenges in executing machine learning models exclusively on the client device, as repeated downloads of a changed model or network would be required to have the best possible performance on the client device.

SUMMARY

The appended claims may serve as a summary of the invention.

DETAILED DESCRIPTION

Figure 1:
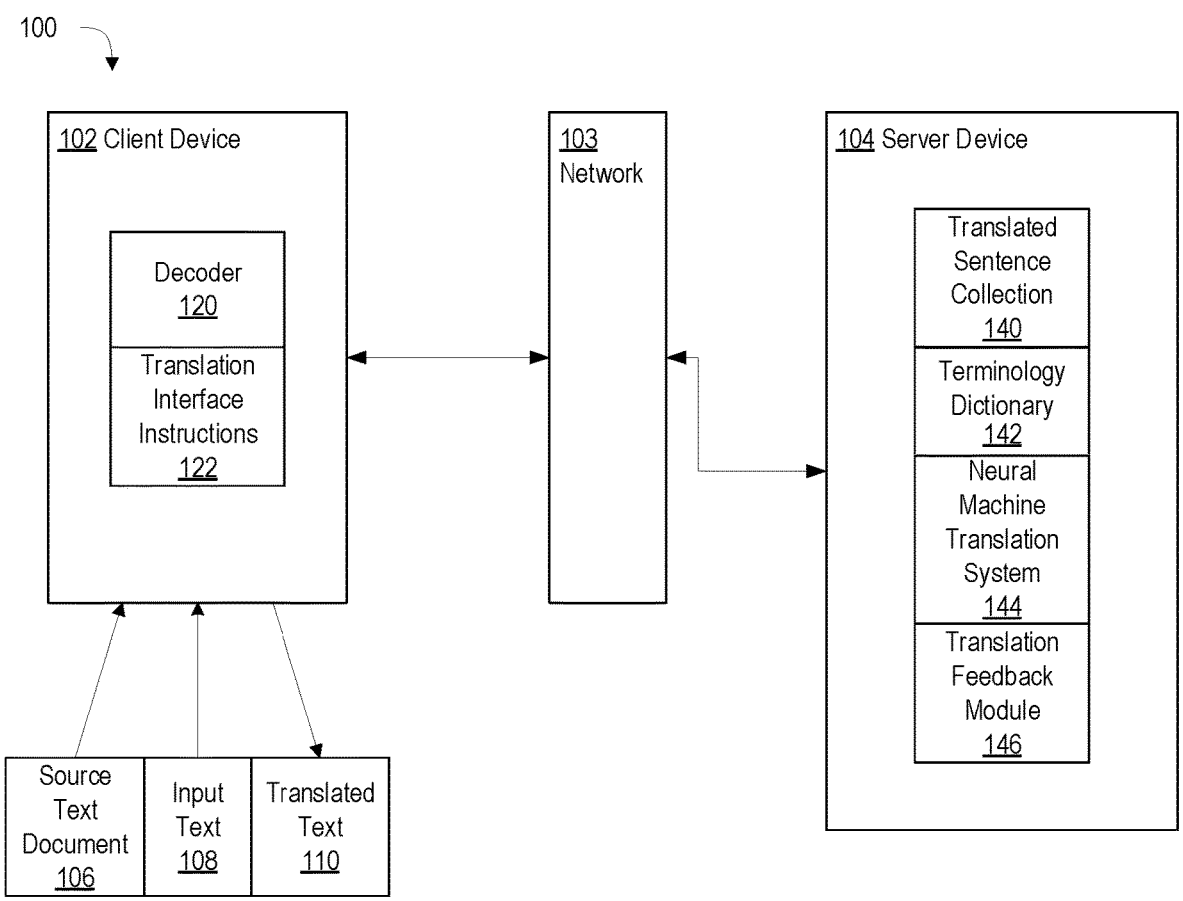
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The disclosure provides technical solutions to the problems set forth in the Background in several ways. In an embodiment, selected translation functions are executed using client-side code and not server-side code, thereby reducing network latency. In an embodiment, both server-side and client-side elements are programmed for pre-computing, caching, and re-using the parts of the translation process that will not change during interactive use, thereby reducing execution time. In an embodiment, heuristics are programmed and used to avoid re-computing parts of longer translations that are likely to be identical, thereby reducing execution time. With a combination of these techniques, interactive machine translation (MT) systems can minimize the time for computing and displaying translation suggestions on a client device.

The text of this disclosure, in combination with the drawing figures, is intended to state in prose the algorithms that are necessary to program a computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in the sections below according to the following outline:

1. General Overview
2. Structural & Functional Overview
3. Implementation Example—Hardware Overview

1. General Overview

In an embodiment, the disclosure provides a computer-implemented method of interactive machine translation. When using a machine translation program to communicate translation suggestions to a client device that is associated with a user, who may be a translator or a language learner, in the task of translating text from one language to another, the usefulness of the system to the user can depend on the speed with which a server device or other computing elements cooperate to display updates to the client device. The machine translation system may primarily run on a server device, which has access to more processor, storage, and memory resources and thus, more computational power. The user may access the machine translation system using a client device that is coupled to the server device via a data communications network, such as the internet or a local intranet. The client device may be a laptop computer, desktop computer, mobile computing device, or smartphone and typically has less computing power than the server device. The data communications network may use wireless or satellite links with low bandwidth and high latency in some cases. To utilize the greater computing power of the server device while also limiting latency caused by network transfer between the client and server devices, the present disclosure provides techniques for distributing computational load associated with the machine translation between the client device and server device, with specified techniques for distributed computing that the inventors have found, in an inventive moment, to efficiently result in reduction of latency and increases in the speed of displaying translation suggestions.

Furthermore, embodiments facilitate the execution of adaptive machine translation systems in which the parameters of the network change regularly. A system is adaptive if its parameters are updated based on the translations of previous segments provided by the user, either interactively or otherwise. The parameters of the network, which change with each translated segment, may be updated and stored on the server. This approach provides far greater flexibility and better performance than a system in which the entire network must be downloaded to a client for execution.

In an embodiment, a client device opens a digital electronic document. The document may contain text in a human-readable source language for translation into a human-readable target language, which language is different than the source language. A document opening operation may be programmed as part of a program on the client device using a File→Open dialog or a similar programmatic mechanism. Sometime before or after the document is opened, a client-side decoder associated with a machine translation system may be loaded onto the client device. For purposes of this disclosure, "decoder" describes any information, such as the parameters of part of a neural network, which are required in addition to the output of an encoder in order to compute a translation suggestion. Prior to the loading, the decoder may be downloaded at least once from the server device. At the time of loading, the decoder may either be in client-side persistent digital data storage or on the server device.

In an embodiment, encoder outputs and an initial translation of the document from the source to the target language are executed on the server device. For purposes of this disclosure, "encoder outputs" or "outputs of an encoder" describe any intermediate results that can be computed from source text alone without observing any information about its target translation. Since the encoder outputs will not change with any updated suggestions, the pre-computed translation results and the pre-computed encoder outputs can be generated once on the server device before being downloaded to the client device. After the pre-computed translation results and the pre-computed encoder outputs are downloaded to the client device, the client-side code is programmed to cause displaying a machine translation suggestion on a display device of the client device. The machine translation suggestion comprises the pre-computed translation results.

In an embodiment, the machine translation suggestion may serve as a guide for manual action to translate the document from the source language into the target language. In an embodiment, a user-entered translation is termed a prefix. If the prefix matches the machine translation suggestion, in an embodiment, the machine translation suggestion is not re-computed. In an embodiment, if the client device receives a prefix that deviates from the pre-computed translation results, then the machine translation suggestion is re-computed to cause generating better translation suggestions. In an embodiment, client-side code is programmed to apply the client-side decoder to the pre-computed encoder outputs using the prefix as a constraint. Then, the machine translation is updated using the output of the client-side decoder. An updated machine translation suggestion is displayed on the display device. The foregoing steps may be executed in other iterations in response to one or more other deviations from the updated suggestion and the prefix.

In an embodiment, the server device generates the pre-computed translation results for the document and the pre-computed encoder outputs before downloading to the client device. Generating the pre-computed translation results for the document and the pre-computed encoder outputs may be executed immediately in response to executing the document opening function. In another embodiment, the client-side decoder may use a neural network to create an output, which neural network may use a Transformer architecture or derivatives that use the mechanism of attention, weighing the influence of different parts of the input data.

In another embodiment, an algorithm may be used to align the pre-computed translation with a partial new translation to generate a concatenated full translation of the text. An alignment may be improved using lexical information.

In an embodiment, a heuristic may be used to align the prefix to the pre-computed translation results, creating an altered translation. The pre-computed translation results may even be generated using a third-party system with which a machine translation has already been made without the benefit of a prefix.

In another embodiment, the pre-computed encoder outputs may be cached on the client device. To save space in the memory of the client device, the pre-computed encoder outputs may be deleted from the cache after the user has finished translating the segments associated with those encoder outputs, as the encoder outputs are, at that point, unnecessary.

2. Structural & Functional Overview

In embodiments, the present disclosure provides computer-implemented methods and systems programmed to translate text from one language (a "source language") into another different language (a "target language"), starting with an initial machine translation of a document. This initial machine translation may be presented to a client device that is associated with a user, who may be a translator or a language learner, as a suggestion. Using the client device, the user may then input text, called a prefix, in the target language representing a user translation. The prefix is used as a constraint in subsequent decoding as initial encoder outputs from the text in the source language are input back into a client-side decoder to generate an updated translation suggestion. The resulting suggestion will then be consistent with and follow naturally from the text inputted by the user and is more likely to be accepted by the user as a result.

In some embodiments, a method to improve computer-assisted translation is shown. In the context of computer-assisted translation, a human translator is given a document written in a source language and is asked to translate it to a target language. The document may consist of a number of segments of text in the source language, and the translator is responsible for translating each of these source segments into the target language. In an embodiment, a machine translation (MT) system is used to assist the translators in performing this translation process more efficiently by displaying suggestions for potential translations of each of the source segments.

In some embodiments, an MT system receives an input text in a source language and outputs an initial translation of that text in a target language. For example, if the source language is English and the target language is Spanish, inputting "The kids play video games" to an English-to-Spanish MT system might output "Los niños juegan videojuengos." In some embodiments, a prefix-constrained machine translation system, or interactive MT system, is programmed to further improve the translation by using the start of a human-generated translation, or the prefix, in the target language as a constraint on the machine-translation output. In an embodiment, the MT system is programmed to present an initial MT suggestion that presents the machine translation output without any prefix. As a user enters the translation in the target language in an interface of a client device, for example, by typing or speaking, a prefix is formed and stored in the client device memory. As the user continues to input the translation in the target language, the prefix changes. As the prefix changes, the interactive MT system re-computes updated translations that begin with these updated prefixes. The updated translations may be presented on the client device to the translator as updated MT suggestions. In the example of the English-to-Spanish translation, a translator may see the initial output and type in the word "Las." The interactive MT system may then update the MT suggestion to translate the English phrase to "Las niñas juegan videojuegos."

In an embodiment of an MT system using an encoder and decoder, the encoder may have a transformer architecture and the decoder may have a Long Short-Term Memory (LSTM) architecture, or vice versa. In other embodiments, the encoder and decoder may have the same architecture as each other or a combination of different known architectures. The MT system is programmed to convert the source text and prefix into a numeric representation of tensors representing tokens. The encoder receives the tensors representing the source text tokens. The source text tokens pass through multiple layers of the encoder, including a self-attention layer and a feed-forward neural network. The decoder receives the source text tokens and completes execution translation using algorithms or neural networks. In an embodiment, the decoder may comprise three layers, with an attention layer between the self-attention and feed-forward neural network layers that focus the decoder on relevant parts of the sentence. The output of the decoder is a tensor of numbers representing numeric tokens. The output numeric tokens are converted into text in the target language and output to a display device as an MT suggestion. These and other neural network architectures commonly used in machine translation programs may use attention mechanisms to account for context in the encoder-decoder process. Example architectures include LSTM and Recurrent Neural Network (RNN).

In one embodiment, an initial MT suggestion is pre-computed at a server device. The initial MT suggestion is generated by an MT system using a document with a source text as input with no prefix. Generating the initial MT suggestion may be executed any time after the server device hosting the MT system receives the document, for example, via an upload from a client device. In an embodiment, in response to a document opening operation executed at the client device, the client device is programmed to download the pre-computed initial MT suggestions from the server device and to display the pre-computed initial MT suggestions as MT suggestions on a display device of the client device.

In an embodiment, the pre-computed MT suggestions are continuously displayed on the client device as long as a prefix matches the MT suggestion. If a prefix entered at the client device deviates from the pre-computed MT suggestion, then a request is sent to the decoder to generate an updated MT suggestion. In some embodiments, the decoder is programmed on the client device, thus significantly reducing any network latency that would otherwise occur during the process of interactive machine translation.

FIG. 1 illustrates a distributed computer system showing the context of use and principal functional elements with which one embodiment could be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

The computer system 100 comprises a client device 102 that is communicatively coupled to a server device 104 via a network 103. The network 103 may be any combination of wired or wireless networks using terrestrial or satellite links, comprising one or more local networks, wide area networks, and/or internetworks. Client device 102 may comprise a desktop computer, laptop computer, tablet computer, smartphone, or other computer. The client device 102 is programmed with a decoder 120 of a machine translation program, which may be stored in the memory of the client device 102 or downloaded from the server device 104.

The memory of the client device 102 is also programmed with translation interface instructions 122. The translation interface instructions 122 may be programmed to communicate with server device 104 to obtain instructions capable of rendering an interface that accepts an upload of a source text document 106 or a document containing text in a source language. In some embodiments, the translation interface instructions 122 may be programmed to communicate with server device 104 to obtain an interface that accepts individual phrases in the source language as input text 108. The translation interface instructions 122 may be programmed to display the machine translation suggestion as translated text 110 on the client device 102.

Server device 104 is communicatively coupled to network 103. In an embodiment, server device 104 is programmed to execute principal operations associated with translations. In an embodiment, server device 104 may store a translated sentence collection 140 and a terminology dictionary 142. In an embodiment, server device 104 hosts a neural machine translation system 144 that is programmed based upon any of a number of different neural network models such as the Transformer model, a Recurrent Neural Network (RNN) model, or a Long Short-Term Memory (LSTM) model. Any of these neural network models can be trained and then run with greater accuracy and efficiency with regard to translating than classic machine translation techniques that rely on dictionaries, algorithms, and/or heuristics. The server device 104 may also store a translation feedback module 146 that is programmed to interact with the client device.

Figure 2:
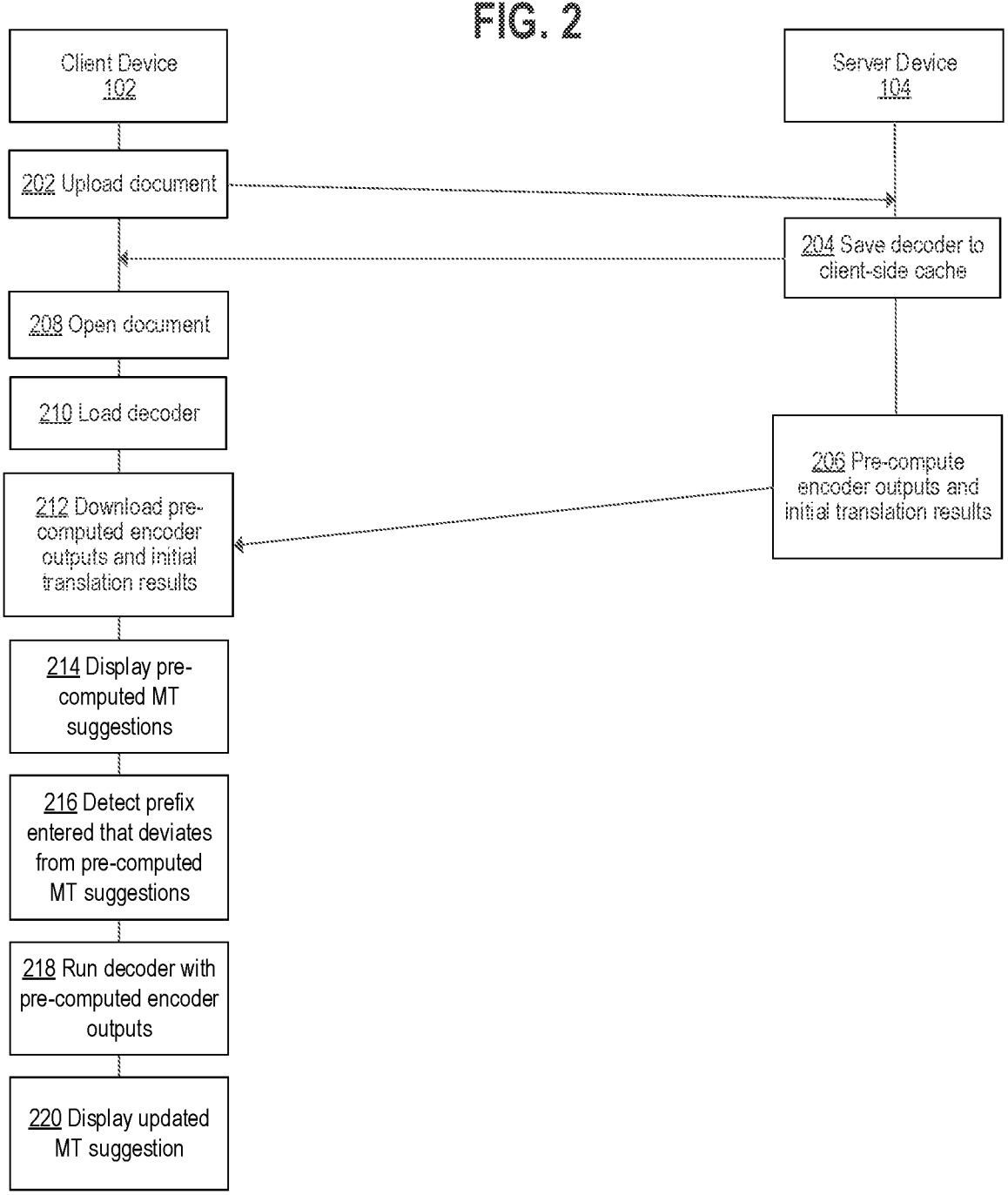
FIG. 2 illustrates an example process for performing an initial translation that is later updated using a prefix typed by a human translator.

FIG. 2 illustrates an example process for performing an initial translation that is later updated using a prefix typed by a human translator. FIG. 2, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

FIG. 2 and each other flow diagram herein is intended as an illustration of the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

FIG. 2 illustrates an example process for performing an initial translation that is later updated using a prefix typed by a human translator. In an embodiment, each of the client device 102 and server device 104 are programmed to execute different and discrete tasks during user-initiated, computer-assisted translation according to an arrangement that the inventors have invented, in an inventive moment, to substantially reduce computational latency and performance latency in MT operations. In one embodiment, client device 102 executes a special-purpose translation application or app that has been programmed to execute the tasks described herein for the client device, and the server device 104 executes a compatible server application program that has been programmed to execute the specific tasks described herein for the server device. The app on client device 102 and the application on the server device 104 may communicate over the network using requests and responses that are defined by an app-specific protocol and formatted, for example, as payloads or parameterized values in HTTP GET and POST messages. Using an app-specific protocol over HTTP is not required and other embodiments may define other programmatic mechanisms for transferring data and/or instructions between the client device 102 and server device 104.

In step 202, a document is uploaded from the client device 102 to the server device 104. For example, a user may invoke a document upload function of the client device 102, select a document that is accessible to the client device in local memory, local non-volatile storage, or network-attached storage, and instruct the client device to upload the specified document to the server device 104.

In step 204, a decoder is saved to a client-side cache. For example, step 204 comprises executing code at client device 102 that is programmed to download a copy of decoder instructions from the server device 104 and store the decoder instructions in an in-memory cache at the client device for later use.

In step 206, a machine translation system pre-computes encoder outputs and initial translation results on server device 104. In an embodiment, server device 104 is programmed to transform human-readable text segments from the uploaded document into numeric representations, or tensors representing tokens, which can be processed by an encoder. The encoder is programmed to receive as input the tensors representing source text tokens. The tensors output by the encoder and the tensors representing the prefix text tokens are programmatically transmitted to the decoder as inputs. The decoder outputs tensors representing tokens in the target language as numbers representing a translation. The server device 104 is programmed to convert the output tensors back into a text representation, which is stored as an initial machine translation suggestion to be downloaded to the client device 102.

In step 208, the document is opened on the client device. In an embodiment, a translator who is ready to start a computer-assisted translation interacts with an interface programmed in the client device 102 to select and open the document.

In step 210, the decoder is loaded on the client device. In an embodiment, loading may consist of downloading the decoder from the server device 104 to the client device 102 or loading a previously downloaded program from persistent storage of the client device.

In step 212, the pre-computed encoder outputs and initial translation results are downloaded onto the client device. For example, client device 102 is programmed to request server device 104 to initiate a download operation to transfer the pre-computed encoder outputs and initial translation results to the in-app memory of the app programmed on the client device.

In an embodiment, the client device 102 is not programmed to execute any machine translation steps. Such an embodiment may be useful when a machine translation has been obtained from a third-party service, such as GOOGLE TRANSLATE, that does not allow for the interactive use of a prefix. If a text in a source language has been translated into a target language without any additional user input, the text may comprise errors that a user wishes to fix. In such a case, the user may use an algorithm to align this third-party translation with a prefix without needing to utilize a neural network.

In step 214, the pre-computed machine translation suggestions are displayed on a display device of the client device 102. In an embodiment, the client device 102 is programmed to continuously display the pre-computed machine translation suggestions as the user enters text, such as through typing on a keyboard or speaking into a microphone, for as long as the client device detects that the text being entered in the target language as the prefix matches what is being presented as an MT suggestion.

In step 216, the process detects that the entered prefix deviates from the pre-computed MT suggestions. For example, the client device is programmed to detect that a single word in an entered sentence is different than in the pre-computed suggestion. In response, in step 218, the process is programmed to execute or run the client-side decoder with the precomputed encoder outputs using the deviating prefix as a constraint. In an embodiment, the process is programmed to output an updated MT suggestion that is tailored to match the user-entered prefix, thus relying on added context to improve its accuracy. In an embodiment, steps 216, 218 execute on the client device 102, even if only the decoder has been downloaded to the client device, since the encoder outputs do not need to be changed in response to changes to the prefix.

In step 220, the process is programmed to display the updated MT suggestion on the display device of the client device. In an embodiment, displaying an updated MT suggestion functions to improve guidance in the continued task of translation than if the MT suggestion is not updated. In an embodiment, because the process of FIG. 2 can reduce the latency of output at client device 102, the updated MT suggestions are more likely to be presented soon enough to help guide the user in translating the text without causing delays for updates or advancing past the updates before the updates can be loaded at the client device.

In an embodiment, the process is programmed to reduce the amount of digital storage space required on the client device 102 by automatically deleting encoder outputs that are no longer necessary. In an embodiment, the process is programmed to detect that an index associated with a prefix corresponds to an index associated with the initial MT suggestion, such that a portion of the initial MT suggestion is overridden by the prefix, and in response, the process is programmed to delete the encoder outputs associated with the portion of the initial MT suggestion which has been overridden by the prefix from the cache storage of the client device.

Alternatively or in addition to the aforementioned methods, the process is programmed to reduce computation time by using a programmed algorithm to determine what portion of the tokens representing text require execution through the decoder to create an accurate, updated MT suggestion. Such an embodiment addresses the issue of computation time potentially significantly increasing for longer segments of text being translated. Even in long segments of text, a deviation in the prefix from the initial MT suggestion generally only affects a few words immediately following the changed word. Most of the initial translation does not need to be changed, so running all the encoder outputs through the decoder is often unnecessary on top of being time-consuming. The decoder can be stopped after it has computed the next few words after the deviation from the MT suggestion without requiring it to run to completion to obtain the updated MT suggestion.

In an embodiment, stopping the decoder is executed by using an algorithm to find positions at which the text of the new, partial MT suggestion corresponds to the initial MT suggestion. The initial MT suggestion may be stored in cache storage at the client device 102 and managed by the app on the client device. After determining that the updated suggestion and original suggestion match, the process is programmed to align the two MT suggestions to generate a new complete MT suggestion. The new complete MT suggestion combines all of the newer, partial translation that has been generated considering the prefix with the remainder of the initial complete MT suggestion, or the part that has not already been covered by the partial translation. This process is not guaranteed to exactly match the result that would be obtained by allowing the decoder to run to completion using the full set of encoder outputs. However, the process is likely to provide a close or exact match.

Code for a basic implementation of this algorithm is set forth in TABLE 1.

may be programmed to grow up to a maximum number of words which may be expressed as, for example, maxSkipSize. The sliding window may grow in either the forward or backward direction each time the algorithm determines that the next text comprises a matching word. With this process, bestIdx is an index value at which the algorithm identifies the last match that is within the window. The algorithm is programmed to select the index associated with a point at which the translation process ends and to select the matching

TABLE 1

EXAMPLE ALGORITHM FOR COMPLETE MT SUGGESTION

```
function alignOldToNewTokens(oldText, newText) {
  // @param {Array<Object>} oldText - A list of token objects for the old, complete translation.
  // @param {Array<Object>} newText - A list of token objects for the new, partial translation.
  // @return {Array<Object>} - A list of token objects for the aligned, complete translation.
  const maxFwdSkipSize = 7;
  const maxBackSkipSize = 5;
  const wordToOccurrenceNumToPositionNew = { };
  for (let idx = 0; idx < newText.length; ++idx) {
    const word = newText[idx];
    if (wordToOccurrenceNumToPositionNew[word] === undefined) {
      wordToOccurrenceNumToPositionNew[word] = [ ];
    }
    wordToOccurrenceNumToPositionNew[word].push(idx);
  }
  let offsetFwd = 0;
  let offsetBack = 0;
  const wordToNumTimesMatched = { };
  let bestIdx = -1;
  for (let idx = 0; idx < oldText.length; ++idx) {
    const word = oldText[idx];
    let numTimesMatched = wordToNumTimesMatched[word];
    if (numTimesMatched === undefined) {
      numTimesMatched = 0;
    }
    if (wordToOccurrenceNumToPositionNew[word] === undefined) {
      continue;
    }
    const occurrenceNumToPosition = wordToOccurrenceNumToPositionNew[word];
    if (numTimesMatched >= occurrenceNumToPosition.length) {
      continue;
    }
    const positionMatched = occurrenceNumToPosition[numTimesMatched];
    let numOffsetBy = positionMatched - idx;
    if (numOffsetBy >= 0) {
      if (numOffsetBy > offsetFwd + maxFwdSkipSize) {
        continue;
      }
      offsetFwd += Math.max(numOffsetBy - offsetFwd, 0);
    } else {
      numOffsetBy = -numOffsetBy;
      if (numOffsetBy > offsetBack + maxBackSkipSize) {
        continue;
      }
      offsetBack += Math.max(numOffsetBy - offsetBack, 0);
    }
    wordToNumTimesMatched[word] = numTimesMatched + 1;
    bestIdx = idx;
  }
  return newText.concat(oldText.slice(bestIdx + 1));
};
```

In an embodiment, the algorithm may include instructions that are programmed to align an older, completed translation with a newer partial translation to create a translation whose prefix is the new translation and the suffix is the remainder of the old translation. In an embodiment, the algorithm is programmed to determine what position, beyond the changed word in the prefix, the words should be changed. Let the endpoint of such a position be termed bestIdx. bestIdx may be found using a greedy approach, programmed to use a sliding window to select new words, the window moving with the index in the initial text. The sliding window index in the initial MT suggestion. Based upon the selected index, the two texts are concatenated to create a full updated MT suggestion to present on or transmit to the client device.

Many enhancements are possible to improve this alignment. For example, rather than considering words as simply binary yes/no matches in the alignment algorithm, the program may count synonyms or words with different conjugations as near-matches.

Figure 3:
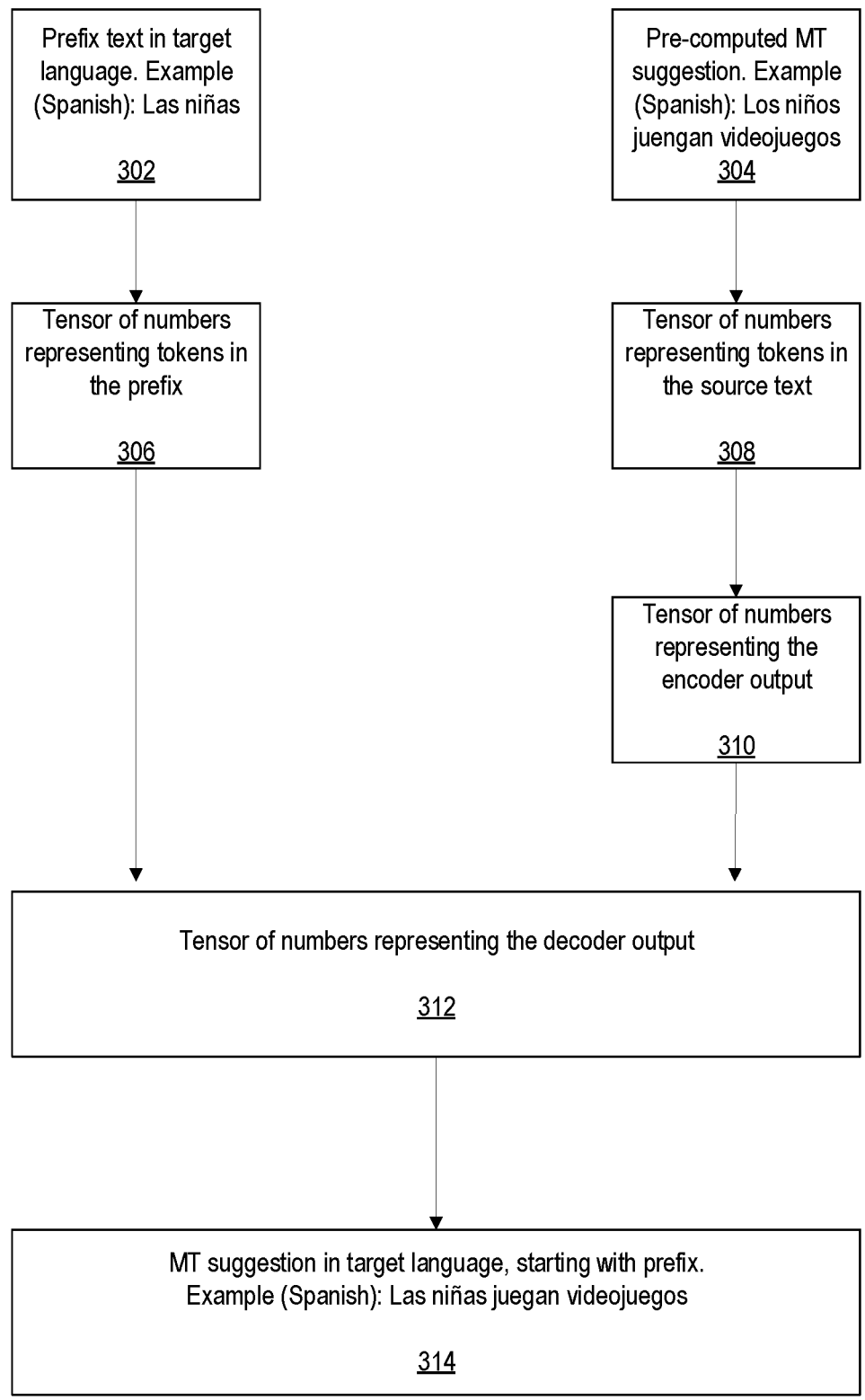
FIG. 3 illustrates an example process for translating human-readable text in one language into human-readable text in another different language.

FIG. 3 illustrates an example process for translating human-readable text in one language into human-readable text in another different language.

In an embodiment, the process of FIG. 3 is programmed to use a Transformer-based model for aligning an existing pre-computed MT suggestion 304 with a user-entered prefix text 302 in a target language. The suggestion and the prefix both may be in the same target language. In an embodiment, the prefix text 302 is different than the pre-computed MT suggestion 304. In an embodiment, the process is programmed to convert the natural language text into a tensor of numbers representing tokens in the prefix text 306 and a tensor of numbers representing tokens in the source text 308. For the pre-computed MT suggestion 304, an encoder is used to provide a tensor of numbers representing the encoder output 310, using as input the tensor of numbers representing tokens in the prefix text 306 and the tensor of numbers representing tokens in the source text 308. A long short-term memory architecture may, for example, be used for the encoding step. The tensor of numbers representing tokens in the prefix text 306 and the tensor of numbers representing the encoder output 310 are then processed using a decoder programmed with an alignment algorithm. The result is an output comprising a tensor of numbers representing the decoder output 312. The results are then aligned and concatenated to present to the user an MT suggestion in the target language, starting with the prefix 314.

Additionally or in the alternative, the process of FIG. 3 may be programmed using an alignment approach for aligning a prefix typed by a user to an MT suggestion. In an embodiment, the process of FIG. 3 may be programmed to heuristically predict an MT suggestion without needing to re-execute the MT system to compute an updated MT suggestion, using the user-entered prefix without the need for pre-computed encoder outputs. The same algorithm that was previously described can be programmed to execute the heuristic prediction by changing the two blocks of text that are being aligned to the user-entered prefix and the initial complete MT suggestion.

In an embodiment, the algorithm is programmed to identify an index in the initial MT suggestion, which corresponds to the index at the end of the user-entered prefix. The algorithm is programmed next to concatenate the user-entered prefix with the portion of the initial complete MT suggestion that follows that index. If the initial MT suggestions are pre-computed, then the algorithm greatly reduces or eliminates network latency and significantly reduces computational time since the alignment process takes less time than re-running the neural network model. An algorithm programmed as stated above also can reduce the amount of memory and/or storage required on the client device 102 since there is no need to download the entire interactive MT model. The decoder on the client device 102 may use the output of a neural network and is programmed to execute a heuristic to perform the alignment. Thus, the complexity of this embodiment is much less than running a full interactive MT system.

In an embodiment, a machine algorithm used to perform an alignment task can be trained to perform more accurately. An algorithm programmed based upon an assumption, namely that finding the correct index in a complete MT suggestion is sufficient to concatenate the prefix with the remainder of the initial complete MT suggestion to get an updated complete MT suggestion, can result in ungrammatical MT suggestions. Generating ungrammatical MT suggestions may be particularly acute if the user-entered prefix has a different word order or grammatical structure than the initial MT suggestion. Sequence-to-sequence models commonly used in machine translation can be programmed to learn these grammatical re-orderings well, for example, using the Transformer model and its attention mechanism to speed up learning. Other neural network models can also be used in place of the Transformer model, such as RNN and LSTM models. Any such model can be trained by comparing the output of the model to known correct translations, such as may be obtained using prefixes. Any such model may be programmed to receive, as input, a complete MT suggestion in the target language, to process the suggestion using an encoder, and to process the suggestion using a decoder while constraining the output to begin with user-entered prefix. The encoding process is less complicated and computation-heavy since the text is already in the target language.

In an embodiment, the client device 102 is not required to run or download the full interactive MT model. Embodiments can also be used to enable third-party MT systems, which do not support prefix-constrained translation, to execute in an interactive fashion. Embodiments do not execute the full task of translation; therefore, a user can use an external machine translation service for the initial translation. An example is GOOGLE TRANSLATE, which only provides an API that takes text in a source language as input and outputs a translation in a target language. In such an embodiment, the algorithm of this disclosure can be executed to re-order the words of the third-party translation output using the third-party translation output and a prefix entered by a user as input. The result is an updated machine translation output which begins with the prefix entered by the user.

Any of the models specified above for embodiments may be trained using a training dataset. Training data can be generated via simulation on a parallel corpus of sentences in the source language and the target language. The source sentence can be run through the MT system to obtain a raw machine translation result. The MT system then can iterate through each index in the target segment word-by-word, and process the part preceding the index as prefix and the part following as suffix. The training data can be prepared to map prefix and raw MT result pairs to the suffix, which suffix represents the remainder of the translation to the target language that the user entered.

In one embodiment, the benefits of the present disclosure are achieved when an initial translation is made on the server device 104 and a decoder on the client device 102 is executed to provide updates. Additionally or alternatively, certain improvements of this disclosure may be used to decrease the computation time associated with using a server device to run a full MT system. For example, the pre-computed encoder outputs would not have to be re-computed. This would not eliminate network latency but would reduce computational latency. Embodiments are also useful when the resources of the client device 102 are particularly low. In such a situation, the time it would take for a decoder on the server device 104 to respond to a request for an updated translation would be reduced since a request for an updated translation is made only in instances where the prefix deviates from a pre-computed MT suggestion instead of doing so continuously. In addition, the alignment tasks would further reduce the amount of unnecessary decoding time.

Embodiments of the present disclosure in which a client device 102 and server device 104 execute specified aspects of translation support have been found to effectively decrease the amount of memory and computational power required by a client device to run a machine translation system. In other embodiments, many of the improvements of this disclosure could be used to improve the efficiency of a full machine translation system running on a client device.

Many laptop computers, tablet computers, other mobile computing devices, or client computers do not have the resources or memory to store the full system. Other client devices with sufficient resources can benefit from the reduction in latency provided by pre-computing a translation before the user begins entering the prefix. For example, the initial machine translation suggestion and the encoding outputs could be generated on the client device and stored in a cache storage of the client device before a user begins a translation process by typing or speaking in a target language, which would reduce or eliminate all network latency and reduce computational latency when computational latency is most deleterious, when the MT system is providing updates to the initial suggestion in response to deviations in the prefix. In such a case, the initial machine translation suggestions may be shown rapidly or nearly instantly as soon as the document is loaded, assuming the document has previously been run through the system. Client-side systems may also benefit from deleting the portion of the initial MT suggestion that has been overridden by the prefix.

6. Implementation Example—Hardware Overview

According to one embodiment, the techniques described herein are implemented by at least one computing device. The techniques may be implemented in whole or in part using a combination of at least one server device and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server devices, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server devices and/or personal computers.

Figure 4:
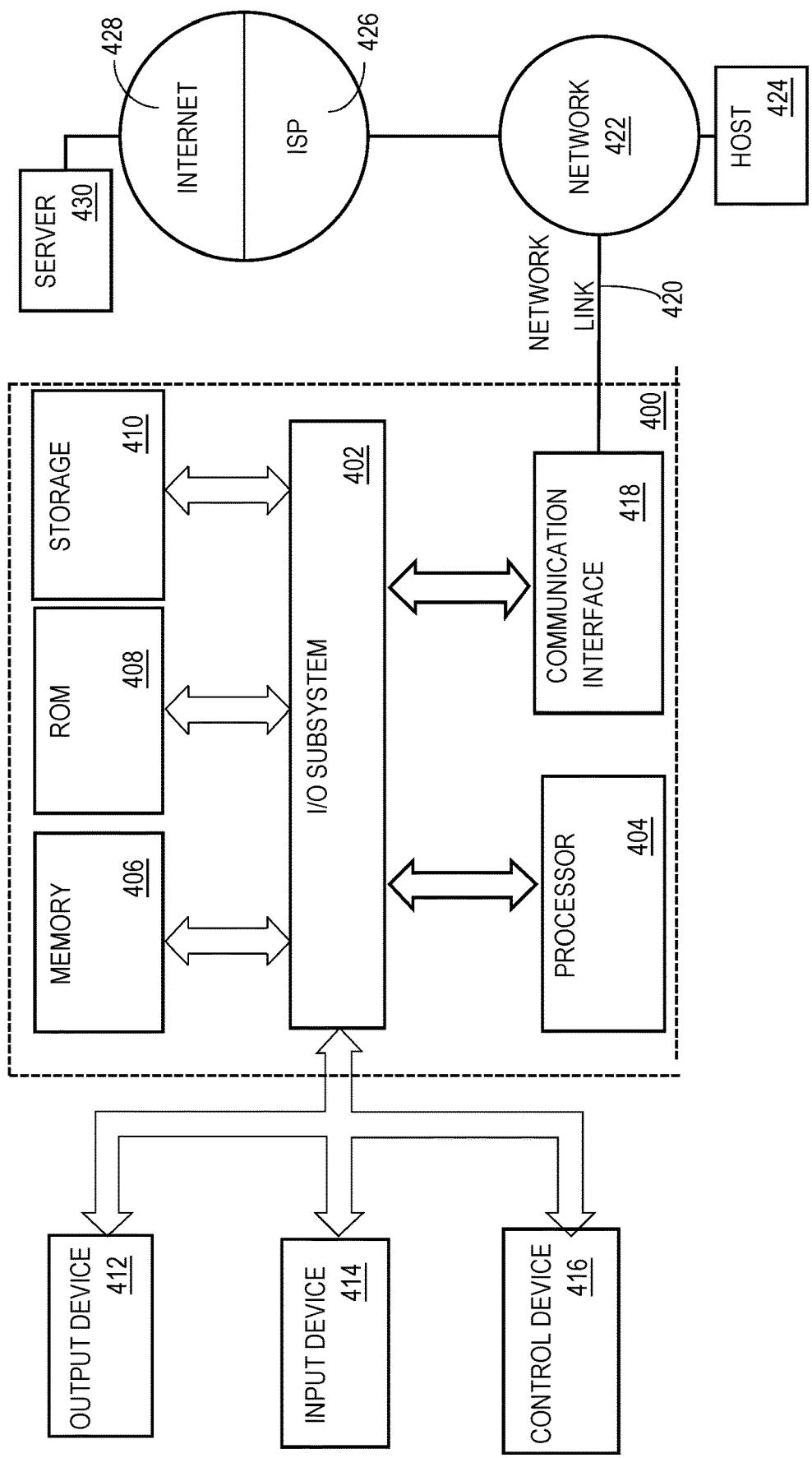
FIG. 4 illustrates a computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on output device 412, which output device 412 may be a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host computer 424 or server device 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to I/O subsystem 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server device 430 may be coupled to internet 428. Server device 430 broadly represents any computer, data center, virtual machine or virtual computing instance with or without a hypervisor, or computer executing a containerized program system such as DOCKER or KUBERNETES. Server device 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server device 430 may form elements of a distributed computing system that includes other computers, a processing cluster, server farm or other organization of computers that cooperate to perform tasks or execute applications or services. Server device 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server device 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server device 430 might transmit a requested code for an application program through internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using a client device that is communicatively coupled to a server device via a data communications network, the method comprising:

using the client device, executing a document opening operation to open a digital electronic document on the client device, the document comprising a first text in a human-readable source language;

loading, onto the client device, from one of client-side persistent digital data storage or the server device, a client-side decoder;

downloading, from the server device to the client device, pre-computed translation results for the document, the pre-computed translation results comprising a second text in a human-readable target language, the target language being different than the source language;

downloading a plurality of pre-computed encoder outputs comprising intermediate results computed from the first text;

displaying, on a display device of the client device, a machine translation suggestion comprising the pre-computed translation results;
receiving, from the client device, a prefix that deviates from the pre-computed translation results, the prefix containing text in the target language;
applying the client-side decoder to the pre-computed encoder outputs using the prefix as a constraint;
updating the machine translation suggestion with an output of the client-side decoder, to form an updated machine translation suggestion and displaying the updated machine translation suggestion on the display device.

2. The method of claim 1, the pre-computed translation results for the document and the pre-computed encoder outputs being generated on the server device before downloading.

3. The method of claim 2, further comprising downloading the pre-computed translation results immediately in response to executing a document opening function.

4. The method of claim 1, further comprising the client-side decoder using a neural network to create the output.

5. The method of claim 4, the neural network using a Transformer model.

6. The method of claim 1, further comprising creating a concatenated full translation using an algorithm to align the pre-computed translation with a partial new translation.

7. The method of claim 6, further comprising using lexical information to improve the alignment.

8. The method of claim 1, further comprising creating an altered translation by aligning the prefix to the pre-computed translation results, the altered translation being created using heuristics.

9. The method of claim 8, the pre-computed translation results being generated using a third-party translation system.

10. The method of claim 1, further comprising:
the plurality of pre-computed encoder outputs being cached on a client system;
a portion of the plurality of the pre-computed encoder outputs being deleted from the cache, the portion being one or more of the plurality of the pre-computed encoder outputs associated with parts of the pre-computed translation which have been overridden by the prefix.

11. A computer system comprising:
a server device comprising one or more processors;
one or more first non-transitory storage media coupled to the server device and storing one or more first sequences of instructions;
a client device that is communicatively coupled to the server device via a data communications network, the client device comprising one or more second non-transitory storage media storing one or more second sequences of instructions;
wherein executing the first sequences and executing the second sequences causes the server device and client device to perform:
using the client device, executing a document opening operation to open a digital electronic document on the client device, the document comprising a first text in a human-readable source language;
loading, onto the client device, from one of client-side persistent digital storage or the server device, a client-side decoder;
downloading, from the server device to the client device, pre-computed translation results for the document, the pre-computed translation results comprising a second text in a human-readable target language, the target language being different than the source language;
downloading a plurality of pre-computed encoder outputs comprising intermediate results computed from the first text;
displaying, on a display device of the client device, a machine translation suggestion comprising the pre-computed translation results;
receiving, from the client device, a prefix that deviates from the pre-computed translation results, the prefix containing text in the target language;
applying the client-side decoder to the pre-computed encoder outputs using the prefix as a constraint;
updating the machine translation suggestion, with an output of the client-side decoder, to form an updated machine translation suggestion and displaying the updated machine translation suggestion on the display device.

12. The computer system of claim 11, the pre-computed translation results for the document and the pre-computed encoder outputs being generated on the server device prior to download to the client device.

13. The computer system of claim 12, further comprising sequences of instructions which when executed by the one or more processors cause the one or more processors to execute downloading the pre-computed translation results to the client device immediately in response to executing a document opening function.

14. The computer system of claim 11, further comprising the client-side decoder using a neural network to create the output.

15. The computer system of claim 14, the neural network using a Transformer model.

16. The computer system of claim 11, further comprising creating a concatenated full translation using an algorithm to align the pre-computed translation with a partial new translation.

17. The computer system of claim 16, further comprising using lexical information to improve the alignment.

18. The computer system of claim 11, further comprising creating an altered translation by aligning the prefix to the pre-computed translation results, the altered translation being created using heuristics.

19. The computer system of claim 18, the pre-computed translation results being generated using a third-party translation system.

20. The computer system of claim 11, further comprising:
the plurality of pre-computed encoder outputs being cached on a client system;
a portion of the plurality of the pre-computed encoder outputs being deleted from the cache, the portion being one or more of the plurality of the pre-computed encoder outputs associated with parts of the pre-computed translation results which have been overridden by the prefix.

21. One or more non-transitory computer-readable storage media storing sequences of instructions which when executed using one or more processors cause the one or more processors to perform:
using a client device, executing a document opening operation to open a digital electronic document on the client device, the document comprising a first text in a human-readable source language;
loading, onto the client device, from one of client-side persistent digital data storage or a server device, a client-side decoder;

downloading, from the server device to the client device, pre-computed translation results for the document, the pre-computed translation results comprising a second text in a human-readable target language, the target language being different than the source language;

downloading a plurality of pre-computed encoder outputs comprising intermediate results computed from the first text;

displaying, on a display device of the client device, a machine translation suggestion comprising the pre-computed translation results;

receiving, from the client device, a prefix that deviates from the pre-computed translation results, the prefix containing text in the target language;

applying the client-side decoder to the pre-computed encoder outputs using the prefix as a constraint;

updating the machine translation suggestion, with an output of the client-side decoder, to form an updated machine translation suggestion and displaying the updated machine translation suggestion on the display device.

22. The non-transitory computer-readable storage media of claim 21, further comprising sequences of instructions which when executed cause generating the pre-computed translation results for the document and the pre-computed encoder outputs on the server device before downloading.

23. The non-transitory computer-readable storage media of claim 22, further comprising sequences of instructions which when executed cause downloading the pre-computed translation results immediately in response to executing a document opening function.

24. The non-transitory computer-readable storage media of claim 21, further comprising sequences of instructions which when executed cause the client-side decoder using a neural network to create the output.

25. The non-transitory computer-readable storage media of claim 24, the neural network using a Transformer model.

26. The non-transitory computer-readable storage media of claim 21, further comprising sequences of instructions which when executed cause creating a concatenated full translation using an algorithm to align the pre-computed translation with a partial new translation.

27. The non-transitory computer-readable storage media of claim 26, further comprising sequences of instructions which when executed cause using lexical information to improve the alignment.

28. The non-transitory computer-readable storage media of claim 21, further comprising sequences of instructions which when executed cause creating an altered translation by aligning the prefix to the pre-computed translation results, the altered translation being created using heuristics.

29. The non-transitory computer-readable storage media of claim 28, the pre-computed translation results being generated using a third-party translation system.

30. The non-transitory computer-readable storage media of claim 21, further comprising sequences of instructions which when executed cause:

the plurality of pre-computed encoder outputs being cached on a client system;

a portion of the plurality of the pre-computed encoder outputs being deleted from the cache, the portion being one or more of the plurality of the pre-computed encoder outputs associated with parts of the pre-computed translation results which have been overridden by the prefix.

* * * * *